(12) United States Patent
Naslund et al.

(10) Patent No.: US 10,718,787 B2
(45) Date of Patent: Jul. 21, 2020

(54) LOW PROFILE AIR DATA ARCHITECTURE

(71) Applicant: Rosemount Aerospace Inc., Burnsville, MN (US)

(72) Inventors: Brian Brent Naslund, Chanhassen, MN (US); Ronald Fritz Liffrig, Prior Lake, MN (US); Jaime Sly, Savage, MN (US); Benjamin John Langemo, Shakopee, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 25 days.

(21) Appl. No.: 16/138,493

(22) Filed: Sep. 21, 2018

(65) Prior Publication Data

US 2019/0094256 A1 Mar. 28, 2019

Related U.S. Application Data

(60) Provisional application No. 62/562,296, filed on Sep. 22, 2017.

(51) Int. Cl.
*G01P 5/26* (2006.01)
*G01F 1/86* (2006.01)
*G01P 5/14* (2006.01)
*G01P 21/02* (2006.01)

(52) U.S. Cl.
CPC .............. *G01P 5/26* (2013.01); *G01F 1/86* (2013.01); *G01P 5/14* (2013.01); *G01P 21/025* (2013.01)

(58) Field of Classification Search
CPC .............. G01F 1/86; G01P 5/26; G01P 5/14
See application file for complete search history.

(56) References Cited

U.S. PATENT DOCUMENTS

| 6,134,485 A | 10/2000 | Tanielian et al. |
| 6,253,166 B1 | 6/2001 | Whitmore et al. |
| 7,334,467 B1 | 2/2008 | DuPuis |
| 7,490,793 B2 | 2/2009 | Mackness |
| 7,656,281 B2 | 2/2010 | Zhou |
| 7,841,563 B2 | 11/2010 | Goossen et al. |
| 8,095,251 B2 | 1/2012 | Preaux |
| 8,527,233 B2 | 9/2013 | McIntyre |

(Continued)

FOREIGN PATENT DOCUMENTS

| DE | 102014116095 A1 | 6/2015 |
| EP | 0690293 A2 | 1/1996 |

(Continued)

OTHER PUBLICATIONS

Extended European Search Report for European Patent No. 18195402.5 dated Mar. 1, 2019, 9 pages.

(Continued)

*Primary Examiner* — Jewel V Dowtin
(74) *Attorney, Agent, or Firm* — Kinney & Lange, P.A.

(57) ABSTRACT

A system for an aircraft includes a pneumatic sensor, an optical sensor, and a computer system. The pneumatic sensor is configured to sense a value external to the aircraft. The optical sensor is configured to emit an optical signal external to the aircraft and receive an optical response. The computer system is configured to receive the value and the optical response. The pneumatic sensor and the optical sensor do not extend beyond a boundary layer of the aircraft.

20 Claims, 4 Drawing Sheets

(56) References Cited

U.S. PATENT DOCUMENTS

| | | | |
|---|---|---|---|
| 9,334,807 B2 | 5/2016 | deGaribody | |
| 9,465,045 B2 * | 10/2016 | Dos-Reis | B64D 43/00 |
| 9,776,729 B2 * | 10/2017 | Goupil | G01P 21/025 |
| 10,435,170 B2 * | 10/2019 | Carralero | G01F 23/164 |
| 2013/0233989 A1 | 9/2013 | Carpenter | |
| 2015/0168439 A1 | 6/2015 | Genevrier et al. | |
| 2015/0346005 A1 * | 12/2015 | Farokhi | G01P 5/165 |
| | | | 73/861.351 |
| 2016/0257397 A1 | 9/2016 | Conners et al. | |
| 2016/0305977 A1 | 10/2016 | Genevrier et al. | |
| 2019/0210740 A1 * | 7/2019 | Luo | B64D 43/02 |

FOREIGN PATENT DOCUMENTS

| | | |
|---|---|---|
| EP | 1255118 A1 | 11/2002 |
| EP | 2434296 A2 | 3/2012 |
| EP | 3211433 A1 | 8/2017 |
| FR | 2891368 A1 | 3/2007 |
| GB | 2432914 A | 6/2007 |

OTHER PUBLICATIONS

Extended European Search Report for European Patent No. 18195813.3 dated Feb. 22, 2019, 8 pages.
European Office Action dated Feb. 25, 2020, received for corresponding European Application No. 18195402.5, 7 pages.

* cited by examiner

LOW PROFILE AIR DATA ARCHITECTURE

CROSS-REFERENCE TO RELATED APPLICATION(S)

This application claims the benefit of U.S. Provisional Application No. 62/562,296 filed Sep. 22, 2017.

BACKGROUND

The present invention relates generally to sensing systems, and in particular to low profile optical and pneumatic sensors.

Traditional air data systems for aircraft include one or more externally mounted Pitot probes in conjunction with local pressure sources. However, Pitot probes project sharply from the aircraft body and thus, introduce increased drag and reduced survivability for the system. Further, prior systems do not utilize dissimilar measurement sources for air data sensing. Thus, if environmental or other conditions lead to failure of one sensor, failure of all sensors for the air data system may be an issue. It is desirable to remove the effect of the sensors on the aerodynamics of the aircraft, and also provide dissimilar, redundant sensing.

SUMMARY

A system for an aircraft includes a pneumatic sensor, an optical sensor, and a computer system. The pneumatic sensor is configured to sense a value external to the aircraft. The optical sensor is configured to emit an optical signal external to the aircraft and receive an optical response. The computer system is configured to receive the value and the optical response. The pneumatic sensor and the optical sensor do not physically extend beyond a boundary layer of the aircraft.

A method of sensing air data external to an aircraft includes sensing, by a pneumatic sensor, a value external to the aircraft; emitting, by an optical sensor, an optical signal external to the aircraft, wherein the pneumatic sensor and the optical sensor do not extend beyond a boundary layer of the aircraft; obtaining, by the optical sensor, an optical response of the optical signal; and receiving, by a computer system, the value and the optical response.

An aircraft system includes a plurality of pneumatic sensors, a plurality of optical sensors, and a computer system. The plurality of pneumatic sensors are configured to sense a plurality of respective values external to the aircraft. The plurality of optical sensors are each configured to emit a plurality of respective optical signals external to the aircraft and receive a plurality of respective optical responses. The computer system is configured to receive the plurality of respective values and the plurality of respective optical responses. None of the plurality of pneumatic sensors and none of the plurality of optical sensors extend beyond a boundary layer of the aircraft.

DETAILED DESCRIPTION

An air data system is disclosed herein that includes both pneumatic and optical sensors that include a low profile with an aircraft body. The aircraft, or other vehicle, includes at least one pneumatic sensor, and at least one optical sensor. The pneumatic sensors have a low profile such that the entirety of each pneumatic sensor resides within a boundary layer of the aircraft. The optical sensors are also flush with the body of the aircraft such that the optical sensors do not affect the aerodynamics of the aircraft. This way, the entirety of the air data system is low profile and provides reduced drag, improved survivability, as well as dissimilar sensing technologies.

Figure 1:
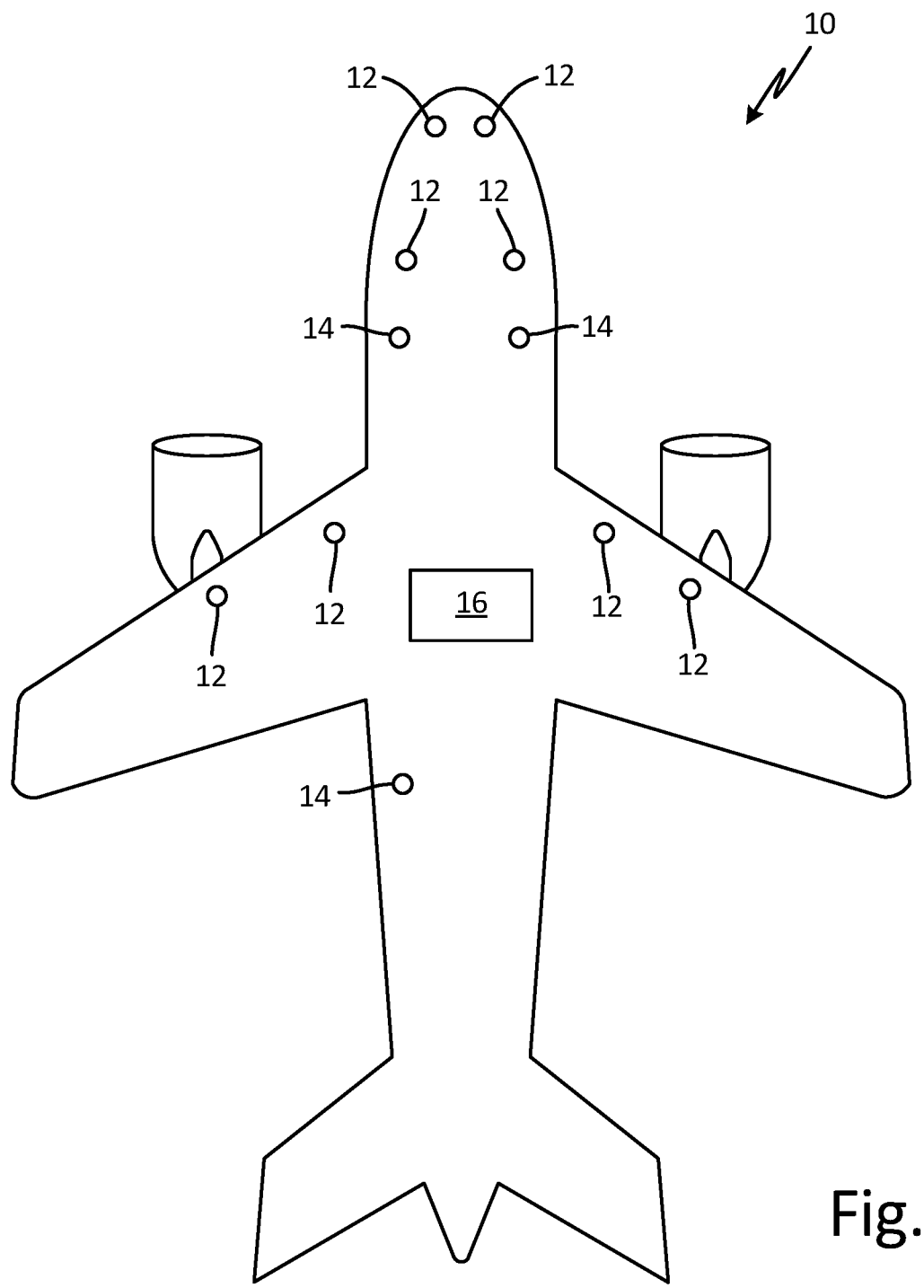
FIG. 1 is a diagram illustrating an aircraft that implements and air data system that includes both optical and pneumatic sensors.

FIG. 1 is a diagram illustrating aircraft 10 that includes both pneumatic sensors 12 and optical sensors 14. Sensors 12 and 14 are connected to onboard computer systems 16. While illustrated as a commercial aircraft, systems that include sensors 12 and 14 may be implemented on other vehicles, such as unmanned aerial vehicles, supersonic aircraft, and missiles, for example. Additionally, the location of sensors 12 and 14 is not limited by the depiction in FIG. 1. Sensors 12 and 14 may be located at any desired point(s) on aircraft 10 or other vehicles. Onboard computer systems 16 may include one or more of avionics systems, data acquisition systems, local sensor controllers, and any other computer systems that may be implemented onboard aircraft 10.

Sensors 12 and 14 may be configured to be low profile such that none of sensors 12 or 14 extend beyond the boundary layer of aircraft 10. Sensors 12 and 14 may be configured, for example, to collect data that allows onboard computer systems 16 to determine a flow field surrounding the body of aircraft 10. In the instance where sensors 12 and 14 are flush to the body of aircraft 10, drag is reduced. Further, aircraft 10 is less observable to radar, because sensors 12 and 14 are less likely to reflect radar energy than prior art Pitot tube systems.

Using readings from sensors 12 and 14, onboard computer systems 16 may be able to calculate local flow fields and navigation data for aircraft 10. These calculations may be supported by Automatic Dependent Surveillance-Broadcast (ADS-B), Global Positioning System (GPS), and/or other data available to onboard computer systems 16. While illustrated as several pneumatic sensors 12 and several optical sensors 14, any number of pneumatic sensors 12 and optical sensors 14 may be implemented on aircraft 10, as desired. While not illustrated in FIG. 1, aircraft 10 may also include an engine total air temperature (TAT) probe or other low profile sensor configured to provide a temperature reading to onboard computer systems 16 to aid in determination of air data. While described for air data applications, data from sensors 12 and 14 may be utilized for any desired purpose. For example, sensors 12 and 14 may be utilized for gust load alleviation, sideslip sensing, and/or other applications. Onboard computer systems 16 may also be configured to implement health monitoring functions. Thus, the local pressures and/or other data obtained by pneumatic sensors 12 and optical sensors 14 may be provided to the health monitoring application and utilized to monitor the health of components of aircraft 10.

By including both optical sensors 14 and pneumatic sensors 12, aircraft 10 is better able to accommodate failure modes specific to one type of sensor. For example, optical sensors 14 will not be physically plugged with ash or rain, while pneumatic sensors are not susceptible to optical issues such as sensor saturation. By including dissimilar technologies, if aircraft 10 encounters conditions that affect one type of sensor, aircraft 10 is still able to obtain and analyze air data using the other type of sensor, thus eliminating common mode failures of the system.

Figure 2A:
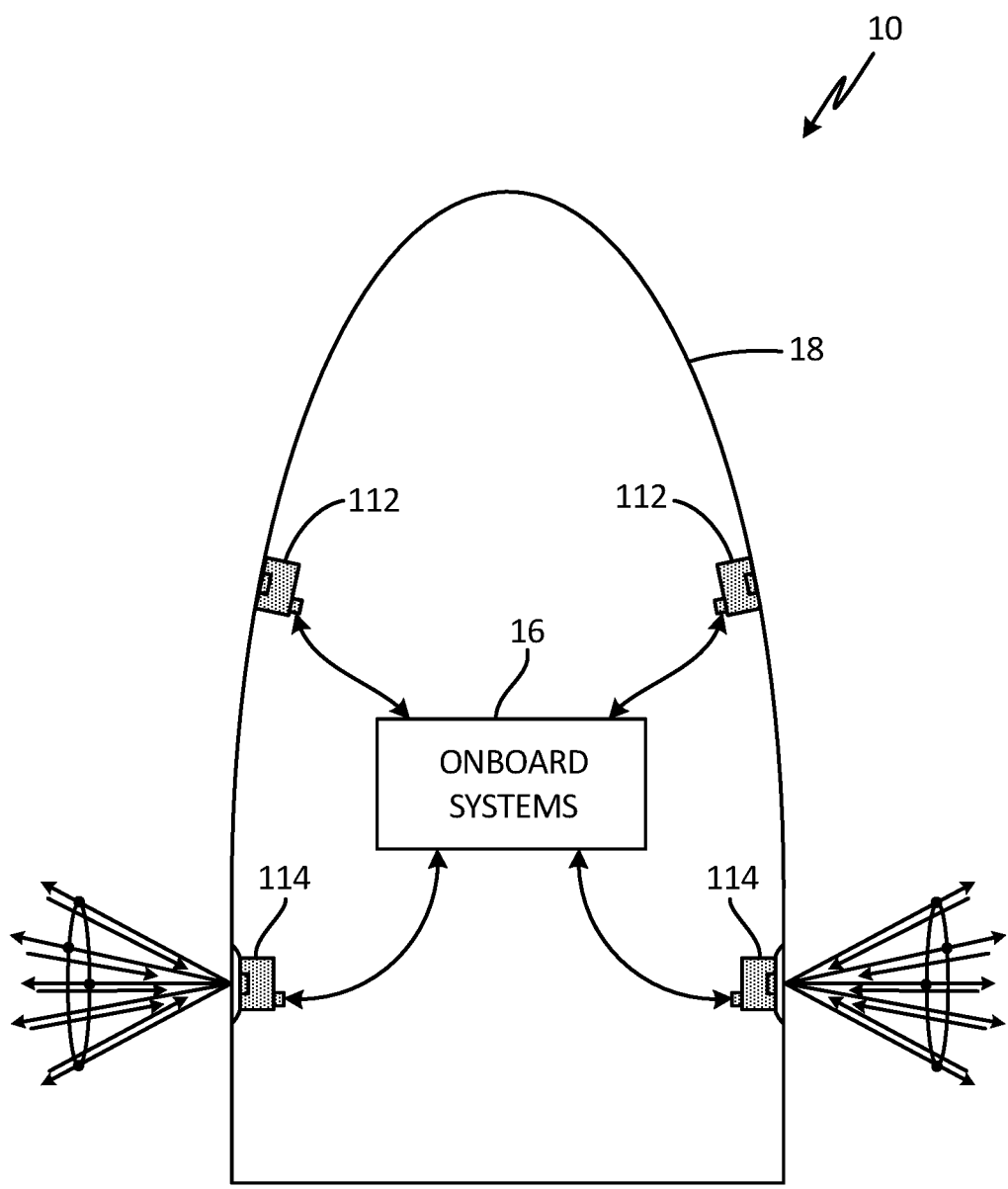
FIGS. 2A-2C are diagrams illustrating embodiments of aircraft systems that include both optical and pneumatic sensors.
Figure 2B:
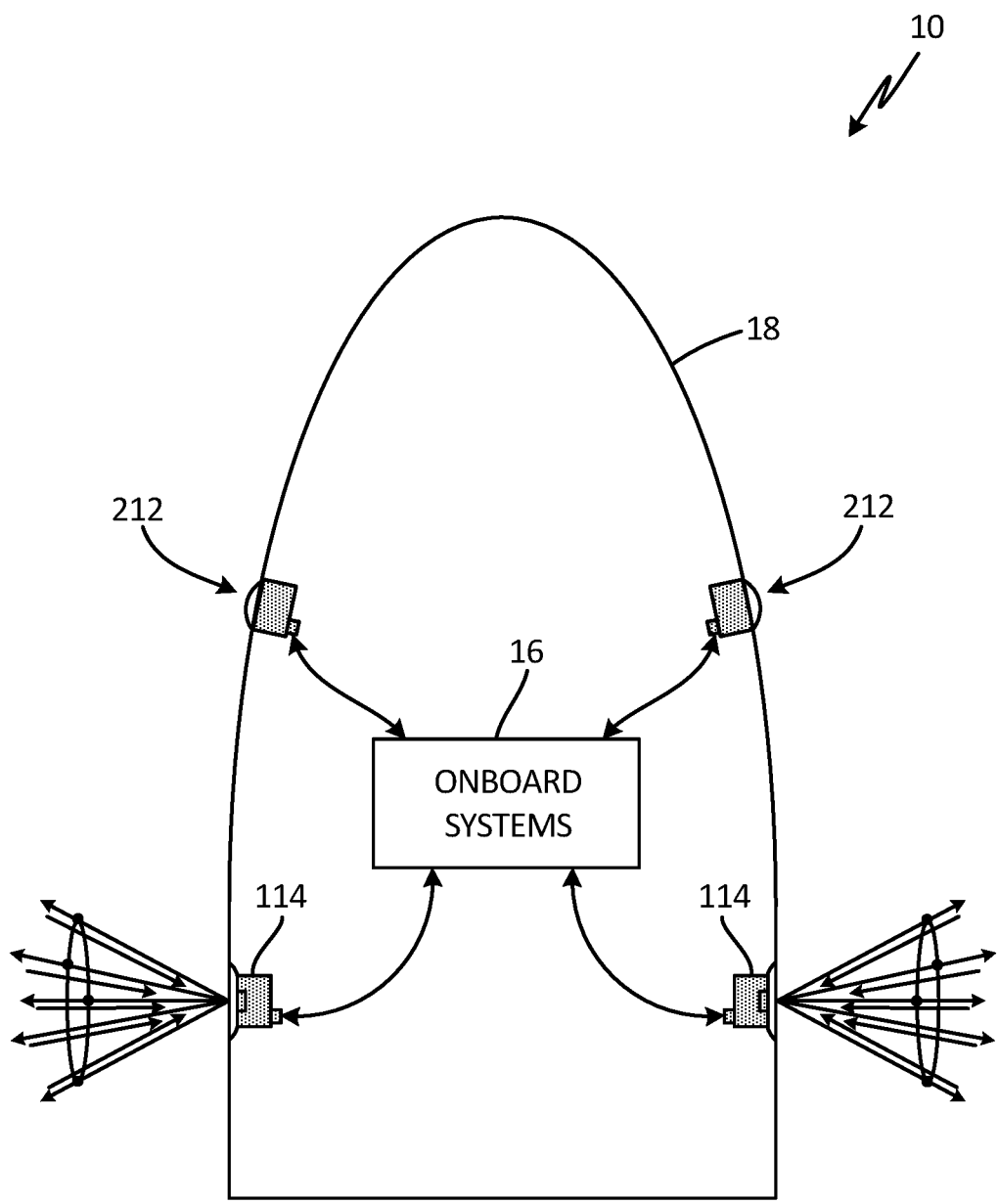
Figure 2C:
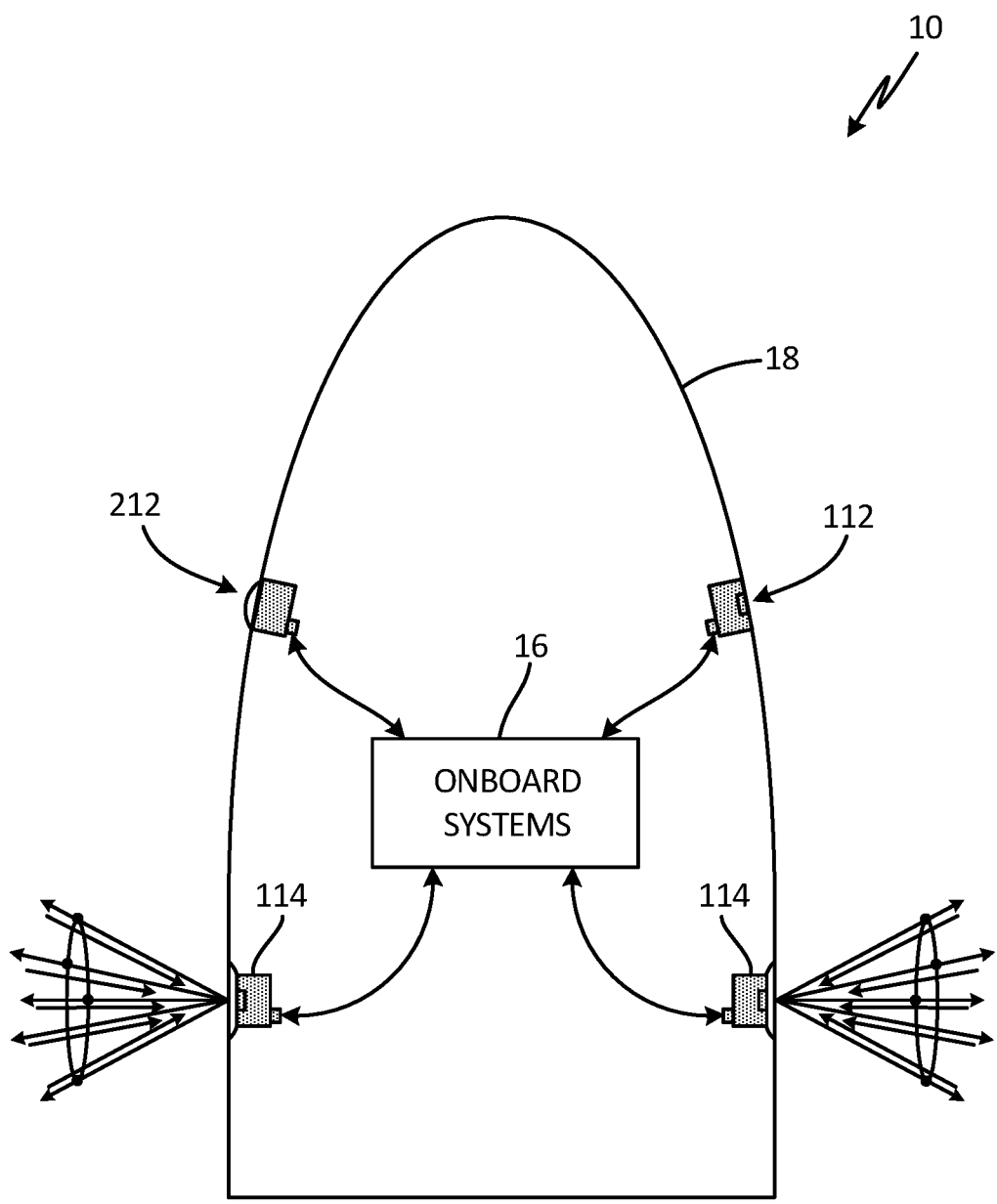

FIGS. 2A-2C are diagrams illustrating embodiments of aircraft systems that include both optical and pneumatic sensors. FIG. 2A illustrates aircraft 10 having pneumatic sensors 112 and optical sensors 114. In the embodiment illustrated in FIG. 2A, pneumatic sensors 112 are flush with body 18 of aircraft 10. In the embodiment shown in FIG. 2A, sensors 112 and 114 are connected to onboard computer systems 16 through a wired connection. This may be an analog wired connection, a digital data bus, or any other form of wired communication. For example, sensors 112 and 114 may be connected to onboard systems 16 using an ARINC bus, controller area network (CAN) bus, or any other type of aircraft data bus. In other embodiments, one or more of sensors 112 and 114 may be connected to onboard computer systems 16 wirelessly.

Sensors 112 and 114 may provide analog outputs directly to onboard computer systems 16, may convert the analog signals into digital signals, and/or may perform local processing on the data obtained by the respective sensor. For example, pneumatic sensors 112 may be configured to sense a local pressure. Pneumatic sensor 112 may include a transducer configured to provide an electrical output indicative of the pressure local to pneumatic sensor 112. In one embodiment, this electrical output may be directly transmitted to onboard systems 16. In another embodiment, pneumatic sensor 112 may include an analog to digital converter configured to convert the analog electrical output into a digital value. Pneumatic sensor 112 may also include circuitry configured to correct the electrical output to obtain a digital, corrected, pressure value.

Optical sensors 114 may be configured to emit an optical signal external to aircraft body 18 through a window or other optical element, for example. The window may be flush with body 18 of aircraft 10. In other embodiments, optical sensors 114 may slightly protrude from aircraft body 18 while remaining physically within the boundary layer. For example, optical sensors 114 may have a "dome" shape that physically extends outward from body 18 into, but not beyond, the boundary layer. In an embodiment, optical sensors 114 are air data sensors that utilize light detection and ranging (LIDAR). Optical sensors 114 may be configured to emit a laser through the window and into the atmosphere. A detector of optical sensor 114 may be configured to collect laser energy reflected off of molecules and/or particulates in the atmosphere. This optical data may then be analyzed to determine conditions of the atmosphere, for example. The captured optical data may be provided directly to onboard systems 16 over a digital data bus, for example, or may be processed locally by a controller or other digital circuit implemented as part of each optical sensor 114.

The analog or digital values obtained by pneumatic sensors 112 and the obtained optical data may be provided to onboard computer systems 16 for storage and/or processing. For example, if onboard computer systems 16 implement an air data application, sensed pressures and obtained optical data may be analyzed to determine a local flow field surrounding aircraft 10. Because optical sensors 114 and pneumatic sensors 112 are flush to, or have a low profile with respect to, body 18 of aircraft 10, the flow field is not affected by optical sensors 114 and pneumatic sensors 112. In another example, sensed pressures and obtained optical data may be stored and analyzed at a later time for health monitoring purposes.

FIG. 2B illustrates aircraft 10 having pneumatic sensors 212 and optical sensors 114. Pneumatic sensors 212 have a "bump" or "bubble" shape and protrude slightly from body 18 of aircraft 10. Sensors 212 do not extend beyond a boundary layer surrounding body 18 of aircraft 10 and provide no significant breaks with body 18. In one embodiment, sensors 212 may be implemented as low profile sensors disclosed in U.S. Pat. No. 6,550,344 B2, which is incorporated herein by reference in its entirety. Because the body of sensors 212 extend into the boundary layer, sensors 212 may be able to sense data beyond local pressure. For example, in addition to local pressure, the "bump" of sensors 212 may be shaped such that sensor 212 is capable of measuring Pitot pressure, angle of attack, and angle of sideslip, for example, and provide these measurements to onboard computer systems 16.

FIG. 2C illustrates aircraft 10 have both pneumatic sensors 112 and 212. Using both types of pneumatic sensors for aircraft 10 may increase the reliability and robustness of the data obtained for aircraft 10. For example, as discussed above, sensor 212 may be able to sense data beyond local pressure. Therefore, in some embodiments, flush sensors 112 may be utilized in locations on aircraft body 18 where it may be more desirable to have as minimal of an impact on aerodynamics as possible, while including sensors 212 to increase the sensing capabilities of the system.

By utilizing a system that includes optical sensors 114, and pneumatic sensors 112 and 212, air data may be determined while minimizing the aerodynamic effect on aircraft 10. None of sensors 112, 114 and 212 provide any significant breaks with body 18 of aircraft 10, and none of sensors 112, 114 and 212 extend beyond a boundary layer of aircraft 10. Additionally, common mode failures are reduced or eliminated by using both pneumatic sensors and optical sensors for determination of air data.

Discussion of Possible Embodiments

The following are non-exclusive descriptions of possible embodiments of the present invention.

A system for an aircraft includes a first pneumatic sensor, a first optical sensor, and a computer system. The first pneumatic sensor is configured to sense a first value external to the aircraft. The first optical sensor is configured to emit a first optical signal external to the aircraft and receive a first optical response. The computer system is configured to receive the first value and the first optical response. The first pneumatic sensor and the first optical sensor do not extend beyond a boundary layer of the aircraft.

The system of the preceding paragraph can optionally include, additionally and/or alternatively, any one or more of the following features, configurations and/or additional components:

A further embodiment of the foregoing system, wherein the first pneumatic sensor protrudes from a body of the aircraft while remaining within the boundary layer of the aircraft, and wherein the first value is at least one of a local pressure, angle of attack, or angle of sideslip.

A further embodiment of any of the foregoing systems, further including a second pneumatic sensor configured to sense a second value external to the aircraft, wherein the second pneumatic sensor is flush with the body of the aircraft.

A further embodiment of any of the foregoing systems, wherein the first optical sensor protrudes from a body of the aircraft while remaining within the boundary layer of the aircraft.

A further embodiment of any of the foregoing systems, wherein the first pneumatic sensor is flush with a body of the aircraft.

A further embodiment of any of the foregoing systems, further including a second optical sensor configured to emit a second optical signal external to the aircraft and receive a second optical response, wherein the computer system is further configured to receive the second optical response.

A further embodiment of any of the foregoing systems, wherein the computer system is configured to determine a flow field around the aircraft using the first value and the first optical response.

A method of sensing air data external to an aircraft includes sensing, by a first pneumatic sensor, a first value external to the aircraft; emitting, by a first optical sensor, a first optical signal external to the aircraft, wherein the first pneumatic sensor and the first optical sensor do not extend beyond a boundary layer of the aircraft; obtaining, by the first optical sensor, a first optical response of the first optical signal; and receiving, by a computer system, the first value and the first optical response.

The method of the preceding paragraph can optionally include, additionally and/or alternatively, any one or more of the following features, configurations and/or additional components:

A further embodiment of the foregoing method, further including determining, by the computer system, a flow field surrounding the aircraft using the first value and the first optical response.

A further embodiment of any of the foregoing methods, further including communicating, via a data bus, the first value from the first pneumatic sensor to the computer system; and communicating, via the data bus, the first optical response from the optical sensor to the computer system.

A further embodiment of any of the foregoing methods, wherein the first pneumatic sensor protrudes from a body of the aircraft while remaining within a boundary layer of the aircraft, and wherein the first value is at least one of a local pressure, angle of attack, or angle of sideslip.

A further embodiment of any of the foregoing methods, further including sensing, by a second pneumatic sensor, a second value external to the aircraft, wherein the second pneumatic sensor is flush with the body of the aircraft.

A further embodiment of any of the foregoing methods, wherein the first pneumatic sensor is flush with a body of the aircraft.

A further embodiment of any of the foregoing methods, further including emitting, by a second optical sensor, a second optical signal external to the aircraft; obtaining, by the second optical sensor, a second optical response of the second optical signal, wherein the first and second optical sensors are flush with a body of the aircraft.

An aircraft system includes a plurality of pneumatic sensors, a plurality of optical sensors, and a computer system. The plurality of pneumatic sensors are configured to sense a plurality of respective values external to the aircraft. The plurality of optical sensors are each configured to emit a plurality of respective optical signals external to the aircraft and receive a plurality of respective optical responses. The computer system is configured to receive the plurality of values and the plurality of respective optical responses. None of the plurality of pneumatic sensors and none of the plurality of optical sensors extend beyond a boundary layer of the aircraft.

The system of the preceding paragraph can optionally include, additionally and/or alternatively, any one or more of the following features, configurations and/or additional components:

A further embodiment of the foregoing system, wherein a first on of the plurality of pneumatic sensors protrudes from a body of the aircraft while remaining within the boundary layer of the aircraft, and wherein the first one of the plurality of pneumatic sensors is configured to measure at least one of a local pressure, angle of attack or angle of sideslip.

A further embodiment of any of the foregoing systems, wherein a second one of the plurality of pneumatic sensors is flush with the body of the aircraft.

A further embodiment of any of the foregoing systems, wherein the plurality of pneumatic sensors are all flush with a body of the aircraft.

A further embodiment of any of the foregoing systems, wherein the computer system is configured to determine a flow field around the aircraft using the plurality of respective values and the plurality of respective optical responses.

A further embodiment of any of the foregoing systems, further including a data bus, wherein the plurality of pneumatic sensors and the plurality of optical sensors communicate with the computer system via the data bus.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for an aircraft, the system comprising:
   a first pneumatic sensor configured to sense a first value external to the aircraft;
   a first optical sensor configured to emit a first optical signal external to the aircraft and receive a first optical response, the first optical sensor comprising:
     a laser configured to emit a beam of laser light into an atmosphere external to the aircraft; and
     a detector configured to detect the laser light reflected by molecules and/or particulates in the atmosphere external to the aircraft; and
   a computer system configured to receive the first value and the first optical response;
   wherein the first pneumatic sensor and the first optical sensor do not extend beyond a boundary layer of the aircraft.

2. The system of claim 1, wherein the first pneumatic sensor protrudes from a body of the aircraft while remaining within the boundary layer of the aircraft, and wherein the first value is at least one of a local pressure, angle of attack, or angle of sideslip.

3. The system of claim 2, further comprising:
   a second pneumatic sensor configured to sense a second value external to the aircraft, wherein the second pneumatic sensor is flush with the body of the aircraft.

4. The system of claim 1, wherein the first optical sensor protrudes from a body of the aircraft while remaining within the boundary layer of the aircraft.

5. The system of claim 1, wherein the first pneumatic sensor is flush with a body of the aircraft.

6. The system of claim 1, further comprising:
   a second optical sensor configured to emit a second optical signal external to the aircraft and receive a second optical response, wherein the computer system is further configured to receive the second optical response.

7. The system of claim 1, wherein the computer system is configured to determine a flow field around the aircraft using the first value and the first optical response.

8. A method of sensing air data external to an aircraft, the method comprising:
sensing, by a first pneumatic sensor, a first value external to the aircraft;
emitting, by a first optical sensor, a first optical signal into an atmosphere external to the aircraft, wherein the first pneumatic sensor and the first optical sensor do not extend beyond a boundary layer of the aircraft;
detecting, by the first optical sensor, the first optical signal reflected by molecules and/or particulates in the atmosphere external to the aircraft;
obtaining, by the first optical sensor, a first optical response of the first optical signal; and
receiving, by a computer system, the first value and the first optical response.

9. The method of claim 8, further comprising determining, by the computer system, a flow field surrounding the aircraft using the first value and the first optical response.

10. The method of claim 8, further comprising:
communicating, via a data bus, the first value from the first pneumatic sensor to the computer system; and
communicating, via the data bus, the first optical response from the optical sensor to the computer system.

11. The method of claim 8, wherein the first pneumatic sensor protrudes from a body of the aircraft while remaining within a boundary layer of the aircraft, and wherein the first value is at least one of a local pressure, angle of attack, or angle of sideslip.

12. The method of claim 11, further comprising:
sensing, by a second pneumatic sensor, a second value external to the aircraft, wherein the second pneumatic sensor is flush with the body of the aircraft.

13. The method of claim 8, wherein the first pneumatic sensor is flush with a body of the aircraft.

14. The method of claim 8, further comprising:
emitting, by a second optical sensor, a second optical signal external to the aircraft, wherein the second optical sensor does not extend beyond the boundary layer of the aircraft; and obtaining, by the second optical sensor, a second optical response of the second optical signal.

15. An aircraft system comprising:
a plurality of pneumatic sensors configured to sense a plurality of respective values external to the aircraft;
a plurality of optical sensors each configured to emit a plurality of respective optical signals external to the aircraft and receive a plurality of respective optical responses, at least one of the plurality of optical sensors comprising:
a laser configured to emit a beam of laser light into an atmosphere external to the aircraft; and
a detector configured to detect the laser light reflected by molecules and/or particulates in the atmosphere external to the aircraft; and
a computer system configured to receive the plurality of respective values and the plurality of respective optical responses;
wherein none of the plurality of pneumatic sensors and none of the plurality of optical sensors extend beyond a boundary layer of the aircraft.

16. The system of claim 15, wherein a first on of the plurality of pneumatic sensors protrudes from a body of the aircraft while remaining within the boundary layer of the aircraft, and wherein the first one of the plurality of pneumatic sensors is configured to measure at least one of a local pressure, angle of attack or angle of sideslip.

17. The system of claim 16, wherein a second one of the plurality of pneumatic sensors is flush with the body of the aircraft.

18. The system of claim 15, wherein the plurality of pneumatic sensors are all flush with a body of the aircraft.

19. The system of claim 15, wherein the computer system is configured to determine a flow field around the aircraft using the plurality of respective values and the plurality of respective optical responses.

20. The system of claim 15, further comprising a data bus, wherein the plurality of pneumatic sensors and the plurality of optical sensors communicate with the computer system via the data bus.

* * * * *